Patented Feb. 28, 1933

1,899,873

UNITED STATES PATENT OFFICE

ROBERT H. LEACH, OF FAIRFIELD, CONNECTICUT, ASSIGNOR TO HANDY & HARMAN, OF NEW YORK, N. Y., A CORPORATION OF NEW YORK

ALLOY

No Drawing. Continuation of application Serial No. 622,108, filed July 12, 1932. This application filed August 13, 1932. Serial No. 628,768.

This invention relates to alloys and is concerned more particularly with a novel alloy which is especially adapted for brazing purposes. The new alloy flows freely at relatively low temperatures so that it can be employed without probability of damage to the objects to be united, it has excellent physical properties which enable it to produce strong joints, and for many purposes it may be used without a flux. Also, the alloy of the invention has a wide range of utility and it may be employed for brazing iron, steel, a large number of non-ferrous metals, and alloys.

The new alloy contains a relatively large proportion of silver and lesser amounts of copper, zinc, cadmium, and phosphorus, the range of these ingredients being substantially as follows:

|  | Per cent |
| --- | --- |
| Silver | 48 to 52 |
| Copper | 12 to 16 |
| Zinc | 14 to 18 |
| Cadmium | 16 to 20 |
| Phosphorus | 0.5 to 2 |

A specific formula for an alloy of the new type which is desirable for the purposes mentioned is given in the following example, in which approximate amounts are given:

|  | Per cent |
| --- | --- |
| Silver | 48 to 49 |
| Copper | 15.5 |
| Zinc | 16.5 |
| Cadmium | 18 |
| Phosphorus | 1 to 2 |

Another specific formula for a satisfactory alloy of the new type is as follows, the amounts being approximate:

|  | Per cent |
| --- | --- |
| Silver | 49 |
| Copper | 15.5 |
| Zinc | 16.5 |
| Cadmium | 18 |
| Phosphorus | 1 |

An alloy within the range mentioned flows freely at about 1175° F. so that it can be widely used for brazing without the liability of the objects to be joined being damaged. At the same time the new alloy has physical properties which make it highly desirable, and for many purposes, it requires no flux. The latter feature is of particular importance since borax, which is a common flux, does not become a thin fluid until heated to about 1400° F. and is almost solid at 1175° F. at which the alloy flows freely. Other combinations of salts which are commonly used as fluxes are also unsatisfactory at the low flow point of this alloy. Accordingly, if the alloy required a flux, it would be necessary to use it at temperatures at which the advantage of its low flow point would be lost, but the addition of the small amount of phosphorus avoids the necessity of employing a flux and, when the phosphorus is kept within the limits mentioned, it does not cause serious embrittlement.

I am aware that silver alloys, known as "solders" and containing silver, zinc, and copper are now in wide use, but, while it is possible to produce a solder containing those three ingredients which has a melting point comparable with that of the new alloy, an alloy consisting of those ingredients and having that melting point does not have satisfactory physical properties. Accordingly, when a silver-copper-zinc alloy is used for brazing, either the objects to be united must be subjected to a temperature which may do damage to them, or else to protect them against such temperatures, an alloy of undesirable physical characteristics must be used. With the new alloy, strong joints may be obtained without using detrimentally high temperatures.

This application is a continuation of my co-pending application, Serial No. 622,108, filed July 12, 1932.

What I claim:

1. An alloy which consists of silver from about 48% to 52%, copper from about 12% to 16%, zinc from about 14% to 18%, cadmium from about 16% to 20%, and phosphorus from about 0.5% to 2%.

2. An alloy which consists of about 48% to 49% silver, about 15.5% copper, about 16.5% zinc, about 18% cadmium, and about 1% to 2% phosphorus.

3. An alloy which consists of about 49% silver, about 15.5% copper, about 16.5% zinc, about 18% cadmium, and about 1% phosphorus.

In testimony whereof I affix my signature.

ROBERT H. LEACH.